United States Patent [19]

Miyamoto et al.

[11] 4,337,280
[45] Jun. 29, 1982

[54] DESENSITIZER COMPOSITION

[75] Inventors: Akio Miyamoto; Teruo Kobayashi; Hiroharu Matsukawa, all of Fujinomiya, Japan

[73] Assignee: Fuji Photo Film Co., Ltd., Kanagawa, Japan

[21] Appl. No.: 204,668

[22] Filed: Nov. 5, 1980

[30] Foreign Application Priority Data

Nov. 6, 1979 [JP] Japan .................. 54/144157

[51] Int. Cl.³ .......................................... B41M 5/00
[52] U.S. Cl. .................................. 427/150; 427/151; 427/152; 427/288; 428/914; 564/505; 564/506
[58] Field of Search ................ 427/150–152, 427/288; 564/506, 505; 428/914

[56] References Cited

U.S. PATENT DOCUMENTS

| | | | |
|---|---|---|---|
| 2,944,985 | 7/1960 | Groote et al. | 564/505 |
| 3,161,682 | 12/1964 | Lesene et al. | 564/505 |
| 3,207,791 | 9/1965 | Meyers et al. | 564/505 |
| 3,231,619 | 1/1966 | Speranza | 564/505 |
| 3,832,402 | 8/1974 | Yeakey | 564/505 |
| 3,931,430 | 1/1976 | Tada et al. | 427/150 |
| 4,039,207 | 8/1977 | Ishizuka | 427/157 |

Primary Examiner—Norman Morgenstern
Assistant Examiner—Janyce A. Bell
Attorney, Agent, or Firm—Sughrue, Mion, Zinn, Macpeak and Seas

[57] ABSTRACT

A desensitizer composition for color developing agents which color upon reaction with colorless compounds comprising an adduct of an amine represented by the following general formula (I) with one or more alkylene oxides, said one or more alkylene oxides comprising at least 40 mole % butylene oxide:

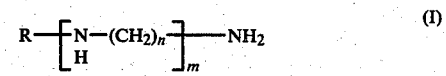

wherein R represents a hydrogen atom or an alkyl group, m represents zero or an integer from 1 to 8, and n represents an integer from 1 to 12. A method of using the same is also disclosed.

6 Claims, No Drawings

DESENSITIZER COMPOSITION

BACKGROUND OF THE INVENTION

1. Field of the Invention

The present invention relates to a desensitizer composition, more particularly, to a desensitizer composition capable of decreasing or halting the function of a color developing agent capable of causing color development on contact with a colorless color forming agent.

2. Development of the Invention

It is known that color images result on reactive contact of an electron donating or proton accepting colorless organic compound (hereinafter called a color forming agents) with an electron accepting or proton releasing solid acid (hereinafter called a color developing agent). Examples of using such reactions are common in the pressure sensitive copying paper art (see, e.g., U.S. Pat. Nos. 2,505,470; 2,505,489, 2,550,471; 2,548,366; 2,712,507; 2,730,456; 2,730,457; 3,418,250 and 3,672,935), in the heat sensitive recording paper (see, e.g., Japanese Patent Publication Nos. 4160/'68, 7600/'68 and 14039/'70; U.S. Pat. No. 2,939,009; etc.), etc.

In addition, a printing process where color images are obtained by applying a color forming agent containing ink to a color developing agent coated sheet is disclosed in German Patent Application (OLS) No. 1,939,962.

Color developing agents as above include clays, phenols, metalic salts of aromatic carboxylic acids, etc.

In general, such color developing agents are uniformly coated over the whole surface of a support, whereafter a printing machine or the like is used to apply a composition containing a desensitizer to only selected areas of the color developer sheet where images are not to be recorded for desensitization of the color developer sheet.

Various desensitizers are described in U.S. Pat. No. 2,777,780; Japanese Patent Publication Nos. 27255/'69, 21448/'70, 22651/'71 and 29546/'71; Japanese patent application (OPI) No. 32915/'72; Japanese Patent Publication Nos. 38201/'72 and 4050/'73; Japanese patent application (OPI) No. 6805/'73; Japanese Patent Publication Nos. 4484/'74, 19647/'74, 23008/'74 and 23850/'74; Japanese patent application (OPI) Nos. 43708/'74, 72009/'74, 77709/'74, 77710/'74, 15513/'74 and 83509/'74; German patent applications (OLS) Nos. 2,343,800, 2,359,079 and 2,361,856, these documents give specific examples of active desensitizers including quaternary ammonium salts such as dodecyltrimethylammonium chloride, octadecylammonium chloride and the like; amines of high molecular weight such as dodecyl amine and the like; substituted oxazolines such as 2,4,4-trimethyl-2-oxazoline and the like; reaction products of diamines or polyamine derivatives having a cyclic structure such as xylene diamine, N-aminopropylpiperidine, etc., with alkylene oxides; glycidyl ether adducts of polyoxyethylene alkylamine, polyoxyethylene alkyl ether, polyoxyethylene alkylphenyl ether, polyethylene glycol, polypropylene glycol, polyoxypropylene alkylamine, spiroacetal series diamines, N-(aminoalkyl)-lactams or amines and the like.

The above desensitizers had a poor desensitizing effect and, because they lacked hydrophobicity, it was impossible to coat them using offset printing which is based on water repulsion.

Given the above, it has been desired in the art to develop hydrophobic desensitizers which possess strong desensitizing capability and which permit printing using generally used offset printers.

SUMMARY OF THE INVENTION

One object of the invention is to provide a desensitizer which has a strong desensitizing effect, hydrophobicity and which can be coated utilizing an offset printer.

The above object is attained with a desensitizer composition capable of decreasing or halting the function of a color developing agent of causing coloration with colorless compounds, which composition is characterized by containing an adduct of an amine having general formula (I) and one or more alkylene oxides comprising at least 40 mole % butylene oxide:

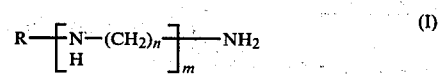

wherein R represents a hydrogen atom or an alkyl group, m represents zero or an integer from 1 to 8, and n represents an integer from 1 to 12.

DETAILED DESCRIPTION OF THE INVENTION

Particularly preferred amines are those wherein R represents a hydrogen atom or an alkyl group containing 8 to 20 carbon atoms, m represents zero or an integer of 1 to 3 and n represents an integer of 2 to 6.

Alkyl groups represented by R may be substituted groups. Such substituent groups contain 1 to 12 carbon atoms and include alkoxy groups, a hydroxy group, a cyano group, halogen atoms, acylamino groups and the like. Further, more than one amine can be used to form the adduct.

In the amine-alkylene oxide(s) adduct employed in the present invention, the alkylene oxide or oxides must comprise 40 mole % or more butylene oxide and may contain alkylene oxides, other than butylene oxide. Preferred alkylene oxides other than butylene oxide include ethylene oxide, propylene oxide, styrene oxide, epichlorohydrin, long chain (maximum: 20 carbon atoms) α-olefin oxides and the like. The alkylene oxide to be used in this invention contains an oxirane group.

The total addition amount of alkylene oxide(s) to one mole of amine(s) preferably ranges from 3 moles to 50 moles, more particularly, from 5 moles to 20 moles.

Amine-alkylene oxide adducts employed in the present invention can be prepared from amines of the general formula (I) and alkylene oxides using the methods described in, for example, U.S. Pat. Nos. 2,695,314 and 3,152,188; KINDAI KŌGYŌ KAGAKU 16, KŌBUNSHI KŌGYŌ KAGAKU I; (Modern Industrial Chemistry, 16th volume; Industrial Chemistry of High Polymers I), second volume, pages 259 to 263, Asakura Shoten, Tokyo.

Specific examples of the amine-alkylene oxide adduct desensitizer employed in the present invention are illustrated below; the present invention is not, of course, to be construed as limited thereto.

-continued
Adduct (i)
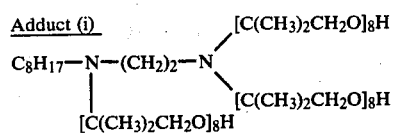
Adduct (ii)
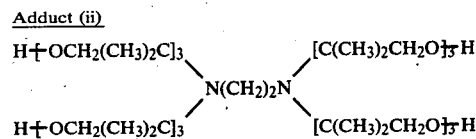
Adduct (iii)
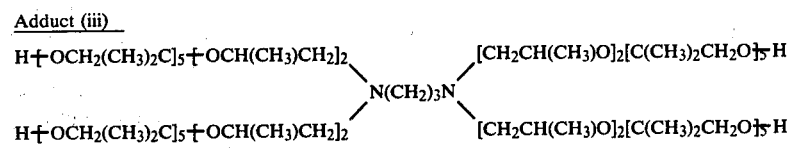
Adduct (iv)
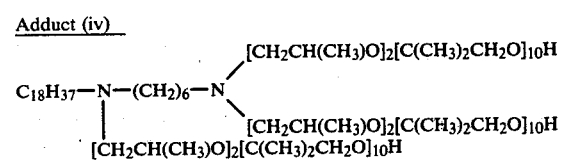
Adduct (v)
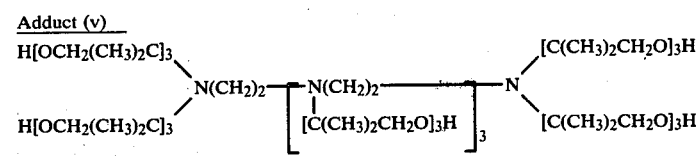
Adduct (vi)
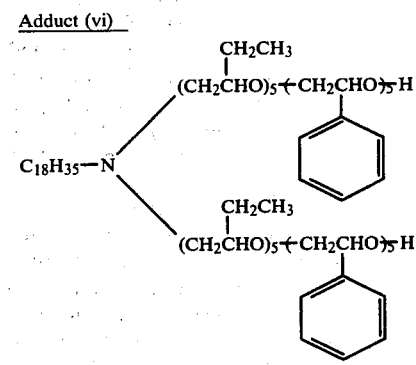
Adduct (vii)
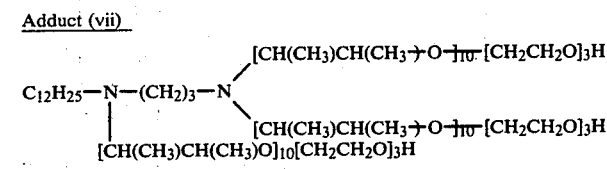
Adduct (viii)
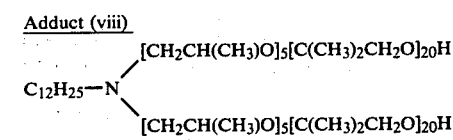
Adduct (ix)
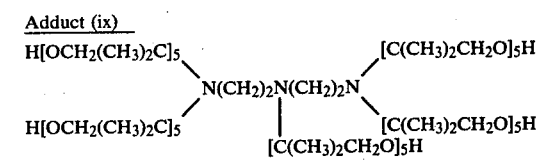
Adduct (x)

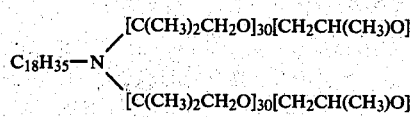

Adduct (xi)

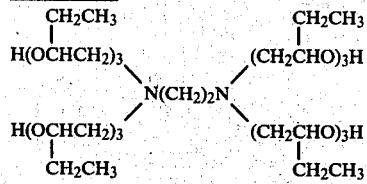

Adduct (xii)

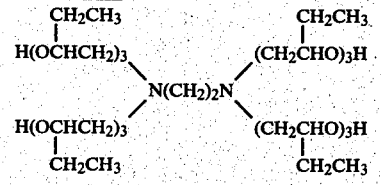

Adduct (xiii)

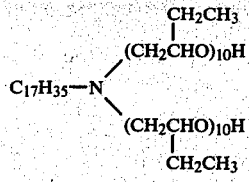

Adduct (xiv)

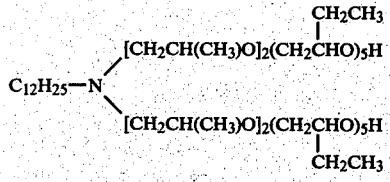

Adduct (xv)

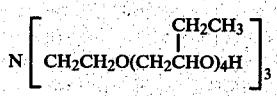

The term desensitizer composition in the present invention signifies a composition containing at least one of the above-described adducts as a desensitizer component and, optionally, various additives. In the desensitizer composition of the present invention, the above compound is preferably present in a proportion of 5 to 60% [by weight based on the weights of desensitizer composition (desensitizer+additives)], more particularly, 15 to 50% (by weight).

Examples of other components which may be present in the desensitizer composition of the present invention include materials for general use in printing inks as are described in detail in E. A. Apps, Printing Ink Technology, chapters 2 to 9, Leonard Hill, London (1961), etc. The printing ink components are useful in the desensitizer of the invention because of a production in the form of the printing ink. Specific examples of such materials include natural or synthetic macromolecular compounds such as ketone resins, polyamide resins, maleic acid resins, phenol resins, epoxy resins, alkyd resins, melamine resins, urea resins, nitrocellulose, ethyl cellulose, butyral resin, polyvinyl alcohol, gelatin, shellac and the like (which may be present in the desensitizer composition in a proportion of 0 to 40 wt%, preferably 5 to 25 wt%, in total desensitizer composition); inorganic substances such as titanium dioxide, barium sulfate, calcium carbonate, talc, kaolin, bentonite, organic bentonite and the like (which may be present in the desensitizer composition in a proportion of 0 to 50 wt%, preferably 0.3 to 40 wt%, in total desensitizer composition); vegetable oils such as linseed oil, tung oil, soybean oil, cotton seed oil and the like (which may be present in the desensitizer composition in a proportion of 0 to 50 wt%, preferably 0 to 20 wt%, in total desensitizer composition); organic solvents such as methanol, ethanol, ethyl acetate, toluene, hexane, methyl ethyl ketone, methyl isobutyl ketone, polypropylene glycol, polybutylene glycol and the like (which may be present in the desensitizer composition in a proportion of 0 to 60 wt%, preferably 0 to 20 wt%, in total desensitizer composition); waxes such as paraffin wax, microcrystalline wax, carnauba wax and the like (which may be present in the desensitizer composition in a proportion of 0 to 10 wt%, preferably 0 to 5 wt%, in total desensitizer composition); off-set inhibitors such as starch, dextrin and the like (which may be present in the desensitizer composition in a proportion of 0 to 10 wt%, preferably 0 to 5 wt%, in total desensitizer composition); and the like.

The desensitizer composition of the present invention can be prepared with ease by one skilled in the art in the processes of mixing the above-described various components, dissolving them and, optionally, kneading by a three-roll mill, a sand mill or the like. The desensitizer composition may be applied to a color developer sheet via a printing machine or spray means, the composition can be molded into the shape of crayon or eraser for writing by hand, or other means may be used.

The desensitizer composition is effectively coated at a coverage of 0.8 to 10.0 g, preferably 1.5 to 6.0 g, per one square meter of color developer sheet.

Specific examples of color developing agents to which the desensitizer composition of the present invention can be applied include clays (e.g., acid clay, activated clay, attapulgite, kaolin, etc.), phenol resins, metal salts of aromatic carboxylic acids (as described in U.S. Pat. No. 3,864,146) and so on.

The phenol resins include phenol-aldehyde polymers (novolak type) and phenol-acetylene polymers. Specific examples of such polymers are p-phenylphenol-formaldehyde polymers, p-fluorophenol-formaldehyde polymers, p-chlorophenol-formaldehyde polymers, p-bromophenol-formaldehyde polymers, p-iodophenol-formaldehyde polymers, p-nitrophenol-formaldehyde polymers, p-carboxyphenol-formaldehyde polymers, o-carboxyphenol-formaldehyde polymers, p-carboalkyoxyphenol-formaldehyde polymers, p-aroylphenol-formaldehyde polymers, p-lower ($C_1$ to $C_8$) alkoxyphenol-formaldehyde polymers, polymers of p-alkyl ($C_1$ to $C_{12}$)phenols (e.g., p-methylphenol, p-ethylphenol, p-n-propylphenol, p-isopropylphenol, p-n-amylphenol, p-isoamylphenol, p-cyclohexylphenol, p-1,1-dimethyl-n-propylphenol, p-n-hexylphenol, p-isohexylphenol, p-1,1-dimethyl-n-butylphenol, p-1,2-dimethyl-n-butylphenol, p-n-heptylphenol, p-isoheptylphenol, p-5,5-dimethyl-n-amylphenol, p-1,1-dimethyl-n-amylphenol, p-n-octylphenol, p-1,1,3,3-tetramethylbutylphenol, p-isooctylphenol, p-n-nonylphenol, p-isononylphenol, p-1,1,3,3-tetramethylamylphenol, p-n-decylphenol, p-isodecylphenol, p-n-undecylphenol, p-isoundecylphenol and p-n-dodecylphenol) with formaldehyde, copolymers of isomers of the above-described p-alkyl ($C_1$ to $C_{12}$)phenols with formaldehyde, copolymers of mixtures containing the above-described alkylphenols and two or more kinds of their respective isomers with formaldehyde, and the like. In addition, the characteristics of the above-described p-substituted phenols are not substantially altered for use in the present invention if they are substituted at the m-position(s) or not. Therefore, the presence of m-substituents is of no importance.

Useful metal salts of aromatic carboxylic acids are described in, for example, U.S. Pat. Nos. 3,864,146 and 3,983,292; Japanese patent application No. 25158/'78; etc.

It is preferred to have hydroxy groups in the positions ortho or para one or more carboxyl groups in the above-described metal salts of aromatic carboxylic acids. Of such aromatic carboxylic acids, salicyclic acid derivatives are preferred and, further, those which have substituent groups containing 8 or more carbon atoms, such as alkyl, aryl, aralkyl, etc., in at least either the o- or p-position(s) to the one or more hydroxy groups, that have in their respective and especially such substituents with substituent groups 8 or more carbon atoms in total are particularly preferred.

Examples of particularly preferred aromatic carboxylic acids include 3,5-di-t-butylsalicylic acid, 3,5-di-t-amylsalicylic acid, 3,5-bis(α,α-dimethylbenzyl)salicylic acid, 3,5-bis(α-methylbenzyl)salicylic acid, 3-(α-methylbenzyl)-5-(α,α-dimethylbenzyl)salicylic acid, 3,5-di-t-octylsalicylic acid, 3-cyclohexyl-5-(α,α-dimethylbenzyl)salicylic acid and the like.

Metals whose ions are reacted with the above-described aromatic carboxylic acids to produce the corresponding salts include magnesium, aluminum, calcium, scandium, titanium, vanadium, chromium, manganese, iron, cobalt, nickel, copper, zinc, gallium, germanium, strontium, yttrium, zirconium, molybdenum, cadmium, indium, tin, antimony, barium, tungsten, lead, bismuth and the like. Of these metals, especially effective are zinc, tin, aluminum and the like, and the most effective metal is zinc among such metals.

The color developing agent is coated on a support, such as paper or the like, together with a binder such as a styrene-butadiene latex at a coverage of 0.1 to 6.0 $g/m^2$.

Examples of color forming agents which undergo coloration reactions together with the color developing agents include diphenylmethane series compounds, triarylmethane series compounds, xanthene series compounds, spiropyrane series compounds and the like.

Specific examples of such color forming agents are of diphenylmethane series compounds, p-tolyl-[4,4'-bis(-dimethylamino)-benzhydryl]-sulfone, phenyl-[4,4'-bis(-dimethylamino)-benzhydryl]-sulfone, 4-chloro-phenyl-[4,4'-bis(dimethylamino)-benzhydryl]-sulfone, 3-nitro-4-methylphenyl-[4,4'-bis(dimethylamino)-benzhydryl]-sulfone, oxime ether body of Michler's hydrol described in Japanese patent application (OPI) No. 148526/'77, and the like; of triarylmethane series compounds, 3,3-bis(p-dimethylaminophenyl)-6-dimethylaminophthalide (Crystal Violet lactone), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis(2-phenylindole-3-yl)-5-dimethylaminophthalide, 3-p-dimethylaminophenyl-3-(1-methylpyrrole-2-yl)-6-dimethylaminophthalide and the like; of xanthene series compounds, Rhodamine B-anilinolactam, Rhodamine B-p-nitroanilinolactam, Rhodamine B-p-chloroanilinolactam, 3-dimethylamino-7-methoxyfluoran, 3-diethylamino-7-methoxyfluoran, 3-diethylamino-6-methoxyfluoran, 3-diethylamino-7-chlorofluoran, 3-diethylamino-7-chloro-6-methylfluoran, 3-diethylamino-6,8-dimethylfluoran, 3-diethylamino-7-acetylmethylaminofluoran, 3-diethylamino-7-methylaminofluoran, 3,7-diethylaminofluoran, 3-diethylamino-7-dibenzylaminofluoran, 3-diethylamino-7-methylbenzylaminofluoran, 3-diethylamino-7-phenylamino-3-methylfluoran, 3-diethylamino-7-chloroethylmethylaminofluoran, 3-diethylamino-7-dichloroethylaminofluoran and the like; of thiazine series compounds, benzoyl leuco Methylene Blue, p-nitrobenzyl leuco Methylene Blue and the like; of spiro series compounds, 3-methyl-spiro-dinaphthopyran, 3-ethyl-spiro-dinaphthopyran, 3,3'-dichloro-spiro-dinaphthopyran, 3-benzyl-spiro-dinaphthopyran, 3- methyl-(3-methoxybenzo)spiro-pyran, 3-propyl-spirodibenzopyran and the like. These compounds may also be used as a color forming agent in the form of mixture, if desired.

The color forming agent may be encapsulated in a proper solvent or dispersed in a binder solution and then coated on a support.

As such solvents, natural or synthetic oils can be used independently or in combination. Specific examples of such solvents include cotton seed oil, kerosene paraffins, naphthene oils, alkylated biphenyls, alkylated terphenyls, chlorinated paraffins, alkylated naphthalenes and the like. Examples of useful encapsulating methods include coacervation of a hydrophilic colloidal sol, as described in U.S. Pat. Nos. 2,800,457 and 2,800,458; interfacial polymerization as described in British Pat. Nos. 867,797; 950,443; 989,264; 1,091,076, etc.

EXAMPLE

The effect of each of the desensitizer composition prepared in accordance with the present invention was confirmed using the following color developer sheets and color former sheet. In the following examples, unless otherwise indicated, all percentages and parts are by weight.

Preparation of Color Developer Sheet A

Activated clay was dispersed in an amount of 200 parts by weight into 800 parts by weight of water and then the obtained dispersion was adjusted to pH=10.0 using a 20% aqueous solution of sodium hydroxide. To the resulting dispersion, were added 40 parts by weight (reduced to solids basis) of a styrene-butadiene copolymer (an average molecular weight: about 30,000 latex having a styrene content of 60 mole %, and 60 parts by weight of a 10% aqueous solution of starch. This coating solution was coated on raw paper having a thickness of 50 g/m² using a coating rod so that the coverage thereof become 6 g/m² (reduced to solids basis) and then dried. The thus prepared sheet was named color developer sheet A.

Preparation of Color Developer Sheet B

To 20 parts by weight of water were added 5 parts by weight of acid clay and 1 part by weight of aluminum oxide. With stirring, the pH of the resulting dispersion was adjusted to 10.5 with a 20% aqueous solution of sodium hydroxide. 6 parts by weight of 10% aqueous solution of gelatin was added thereto and then a solution of 0.56 part by weight of zinc chloride dissolved in 8 parts by weight of water was gradually added. Next, a solution prepared by dissolving 2 parts by weight of 3,5-ditert-butyl-salicylic acid in 20 parts by weight 15% aqueous solution of sodium hydroxide was gradually added to the resulting dispersion at a temperature of 80° C. to cause reaction. The thus obtained dispersion was mixed with 3 parts by weight (reduced to a solids basis) of a styrene-methylmethacrylate copolymer (an average molecular weight: 50,000) latex having a styrene content of 50 mole %. The resulting dispersion was coated on raw paper having a thickness of 50 g/m² using a coating rod so as to have a dry coverage of 4 g/m² and then dried. The thus prepared sheet was named the color developer sheet B.

Preparation of Color Developer Sheet C

Paraphenylphenol and a 37% aqueous solution of formaldehyde were refluxed under heat in amounts of 170 parts by weight and 70 parts by weight, respectively in the presence of 10 parts by weight of 37% hydrochloric acid and 50 parts by weight of water for 10 hours to effect reaction. After cooling, the resulting phenol resin was taken out of the reactor in the form of a powder.

40 parts by weight of the phenol resin obtained per above and 6 parts by weight of a naphthalenesulfonic acid-formalin condensate (condensation degree: 3) were placed in a ball mill together with 54 parts by weight of water and mixing thereof continued for one day. Next, 100 parts by weight of the thus obtained phenol resin dispersion, 160 parts by weight of kaolin and 40 parts by weight (reduced to a solids basis) of a methylmethacrylate-butadiene copolymer latex having a butadiene content of 50 mole % were added to 500 parts by weight of water and thoroughly mixed with vigorous stirring. The resulting dispersion was coated on raw paper having a thickness of 50 g/m² using a coating rod so as to have a dry coverage of 5 g/m² and dried. The thus prepared sheet was named color developer sheet C.

Preparation of Color Former Sheet A 10 parts by weight of acid processed gelatin having an isoelectric point of 8.0 and 10 parts by weight of gum arabic were dissolved in 60 parts by weight of water heated to 40° C. To the resulting solution there was further added 0.2 part by weight of sodium alkylbenzenesulfonate as an emulsifier and then 50 parts by weight of color former oil emulsified therein.

The color former oil was prepared by dissolving 2.5 wt% of Crystal Violet lactone and 2.0 wt% of benzoyl leuco Methylene Blue into an oil comprising 4 parts by weight of diisopropylbiphenyl and 1 part by weight of kerosene.

When the average size of the emulsified drops reached 8 microns, the progress of the emulsification was stopped by adding 100 parts by weight of water heated to 40° C. thereto.

As stirring was continued, 210 parts by weight of water at 30° C. was further added to the emulsified system and then the system pH adjusted to 4.4 by the addition of 20% hydrochloric acid. With further stirring, the resulting solution was cooled to 8° C. and 1.5 parts by weight of 20% glutaraldehyde added thereto.

Subsequently, 30 parts by weight of a 10% carboxymethyl starch solution was poured into the resulting emulsion, the emulsion was adjusted to pH=8.5 by the dropwise addition of a 25% sodium hydroxide solution and then the system heated up to 30° C. to result in the production of microcapsules having hardened walls.

Into the resulting dispersion there was then dispersed 10 parts by weight of cellulose flock, whereafter the dispersion was coated on raw paper having a thickness of 40 g/m² to provide a dry coverage of 6 g/m² and the coating dried. The thus prepared sheet was named color former sheet A.

Preparation of Color Former Sheet B

A color former oil was prepared by dissolving 1 wt% of Crystal Violet lactone, 4 wt% of 3-diethylamino-7-diethylaminofluoran, 4 wt% of 3-diethylamino-7-phenylaminofluoran, 3 wt% of 3-diethylamino-7,8-benzofluoran, 0.5 wt% of 3,6-bismethoxy-fluoran and 2 wt% of benzoyl leuco Methylene Blue (all based on ail weight) into an oil consisting of 1 part by weight of diisopropylnaphthaline, 1 part by weight of diisopropylbiphenyl and 2 parts by weight of 1-(dimethylphenyl)-1-phenylethane. Using a 50 parts by weight portion of the thus prepared color former oil, color former sheet B was prepared in the same manner as color former sheet A.

Preparation of Desensitizer Composition

To each of the desensitizers set forth in Table 1, there was added rosin denatured maleic acid resin (softening point=120° C., acid value=30) in a proportion of 15 parts by weight per 50 parts by weight of desensitizer. The desensitizer and resin were dissolved by heating at 150° C. for 1 hour. To the resulting solution there was added 35 parts by weight of titanium oxide and the resulting mixture kneaded using a three-roller mill. A desensitizing ink was thus prepared.

Testing Process

Each of the desensitizer compositions was printed on each of the color developer sheets using a sheet offset printing machine (produced by Ryobi Kabushiki Gaisha) so that the dry coated amount was 3 g/m$^2$. Next, the offset printability of each desensitizer compositions was evaluated by observing the printed state, i.e., the presence of the stains at the non-desensitized part during the printing.

Next, the desensitized area of the thus obtained samples were brought into face-to-face contact with each of the above-described color former sheets and a pressure load of 600 Kg/cm was applied thereto to test for color development. The desensitizing effect was evaluated by measuring the visual reflection density in the desensitized area by a densitometer (Macbeth RD-514 type). The results obtained are summarized in Table 1.

In Table 1, the desensitizer compositions of the present invention were used in Examples 1 to 3, while conventional desensitizer compositions were used in Comparisons 1 and 2.

As is apparent from Table 1, the desensitizer compositions of the present invention were very effective, namely, though conventional desensitizers do not have offset printing capability at all, the desensitizers of the present invention permit stable offset printing.

In addition, the desensitizing effect of each sheet is evaluated by surface reflection density in Table 1. The smaller the value, the higher the desensitizing effect with values of 0.06 or less indicating complete desensitization. It was thus established that the desensitizer compositions of the present invention can be applied using an offset printing machine, impossible with conventional desensitizer compositions, and exhibit a high desensitizing effect.

While the invention has been described in detail and with reference to specific embodiments thereof, it will be apparent to one skilled in the art that various changes and modifications can be made therein without departing from the spirit and scope thereof.

TABLE 1

| | Structure of Desensitizer Used | Offset Printability | Desensitizing Effect (Reflection Density of Sheet Surface) | | | |
| --- | --- | --- | --- | --- | --- | --- |
| | | | Color Former Sheet A Color Developer Sheet | | | Color Former Sheet B Color Developer Sheet A |
| | | | A | B | C | |
| Example 1 | Tetraethyl/trihydroxypropyl-substituted ethylenediamine: H(OCHCH$_2$)$_3$ and (CH$_2$CHO)$_3$H groups (with CH$_2$CH$_3$ branches) on N(CH$_2$)$_2$N | Stable and high offset printability (No stains were observed over the whole sheet surface) | 0.05 | 0.05 | 0.06 | 0.06 |
| Example 2 | C$_{12}$H$_{25}$N[[CH$_2$CH(CH$_3$)O](CH$_2$CHO)$_{20}$H']$_2$ with CH$_2$CH$_3$ branches | Same as above | 0.06 | 0.05 | 0.06 | 0.05 |
| Example 3 | H(OCHCH$_2$)$_5$ and (CH$_2$CHO)$_5$H groups (with CH$_2$CH$_3$ and CH$_2$CH$_5$ branches) on N(CH$_2$)$_2$N(CH$_2$)$_2$N, with (CH$_2$CHO)$_5$H substituent | Same as above | 0.05 | 0.05 | 0.05 | 0.05 |
| Comparison 1 | H(OCH$_2$CH$_2$)$_3$ and (CH$_2$CH$_2$O)$_3$H groups on N(CH$_2$)$_2$N | Lacking in offset printability (The whole sheet surface was stained) | *— | — | — | — |
| Comparison 2 | C$_{12}$H$_{25}$N[[CH$_2$CH(CH$_3$)O](CH$_2$CH$_2$O)$_{20}$H]$_2$ | Same as above | — | — | — | — |

The mark "*": means that uniformly printing-coated paper was not obtained and therefore, the desensitizing effect cannot be evaluated.

What is claimed is:

1. A desensitizer composition for color developing agents which color upon reaction with colorless compounds comprising an adduct of an amine represented by the following general formula (I) with one or more alkylene oxides, said one or more alkylene oxides comprising at least 40 mole % butylene oxide, general formula (I) being

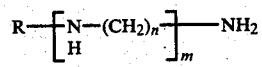  (I)

wherein R represents a hydrogen atom or an alkyl group, m represents zero or an integer from 1 to 8, and n represents an integer from 1 to 12.

2. A desensitizing method in which the desensitizer composition of claim 1 is printed on a color developer sheet using by offset printing.

3. A desensitizer composition of claim 1, wherein said alkylene oxide is a compound having oxirane group.

4. A desensitizer composition of claim 3, wherein said alkylene oxide is ethylene oxide, propylene oxide, styrene oxide, epichlorohydrin and long chain α-olefin oxides.

5. A desensitizer composition of claim 1, wherein the total addition amount of alkylene oxide(s) to one mole of amine(s) ranges from 3 moles to 50 moles.

6. A desensitizer method in which the desensitizer composition of claim 1 is coated at a coverage of 0.8 to 10.0 g per one square meter of color developer sheet.

* * * * *